(12) United States Patent
Shin et al.

(10) Patent No.: US 11,155,006 B2
(45) Date of Patent: Oct. 26, 2021

(54) METHOD AND APPARATUS FOR RELEASING MOLDED ARTICLE FROM MOLD

(71) Applicant: SKC CO., LTD., Gyeonggi-do (KR)

(72) Inventors: Junghwan Shin, Gyeonggi-do (KR); Jung Hwan Myung, Gyeonggi-do (KR); Hyuk Hee Han, Gyeonggi-do (KR); Jongmin Shim, Gyeonggi-do (KR)

(73) Assignee: SKC CO., LTD., Gyeonggi-do (KR)

( * ) Notice: Subject to any disclaimer, the term of this patent is extended or adjusted under 35 U.S.C. 154(b) by 223 days.

(21) Appl. No.: 16/178,276

(22) Filed: Nov. 1, 2018

(65) Prior Publication Data
US 2019/0126515 A1 May 2, 2019

(30) Foreign Application Priority Data

Nov. 2, 2017 (KR) .................. 10-2017-0145244

(51) Int. Cl.
| | | |
|---|---|---|
| *B29D 11/00* | (2006.01) | |
| *B29C 33/44* | (2006.01) | |
| *B29C 37/00* | (2006.01) | |
| *B29K 75/00* | (2006.01) | |

(52) U.S. Cl.
CPC ........ *B29C 33/442* (2013.01); *B29C 37/0007* (2013.01); *B29D 11/0048* (2013.01); *B29D 11/00192* (2013.01); *B29D 11/00221* (2013.01); *B29K 2075/00* (2013.01); *B29K 2909/08* (2013.01)

(58) Field of Classification Search
CPC ........ B29D 11/00192; B29D 11/00221; B29D 11/0048; B29C 33/442; B29C 37/0007
See application file for complete search history.

(56) References Cited

FOREIGN PATENT DOCUMENTS

| | | |
|---|---|---|
| DE | 102012017008 | 11/2013 |
| JP | 7-9509 | 1/1995 |
| JP | 2000210951 | 8/2000 |
| JP | 3614162 | 1/2005 |
| JP | 2008-265070 | 11/2008 |
| KR | 101187975 | 10/2012 |
| TW | 201431898 A | 8/2014 |
| TW | 201710726 | 3/2017 |

OTHER PUBLICATIONS

Office Action issued by the Japanese Patent Office dated Nov. 12, 2019.
Extended Search Report Issued by European Patent office dated Mar. 15, 2019.
Office Action issued by the Taiwan Intellectual Property Office dated May 6, 2019.
Office Action issued by the Taiwanese Patent Office dated Dec. 18, 2020.

*Primary Examiner* — Mathieu D Vargot
(74) *Attorney, Agent, or Firm* — IP & T Group LLP

(57) ABSTRACT

In the method and the apparatus for releasing a molded article from a mold according to the embodiments, the lateral of the molded article in the mold is pressed, so that it is possible to minimize the damage of the mold and the molded article at the time of the release, while the amount of a mold release agent used is minimized.

4 Claims, 1 Drawing Sheet

METHOD AND APPARATUS FOR RELEASING MOLDED ARTICLE FROM MOLD

The present application claims priority of Korean patent application number 10-2017-0145244 filed on Nov. 2, 2017, which is incorporated herein by reference in its entirety.

TECHNICAL FIELD

Embodiments relate to a method and an apparatus for releasing a molded article from a mold. Specifically, the embodiments relate to a method and an apparatus for efficiently releasing a molded article from a mold while minimizing the amount of a mold release agent used, to thereby minimize the damage that may be caused to the mold and to the molded article at the time of the release.

BACKGROUND ART

Optical materials using plastics are lightweight, hardly breakable, and excellent in dyeability as compared with optical materials made of inorganic materials such as glass. Therefore, plastic materials of various resins are widely used as optical materials for eyeglass lenses, camera lenses, and so on. Recently, due to an increased demand of users for higher performance and convenience, studies have continued on optical materials having such properties as high transparency, high refractive index, high Abbe number, low specific gravity, high heat resistance, and high impact resistance.

A polythiourethane-based compound, an acrylic-based compound, or the like is used as a raw material for an optical material. When a polythiourethane-based optical material is produced by reacting a polythiol-based compound and an isocyanate-based compound, or when an acrylic-based optical material is produced by reacting an acrylate compound and an aromatic vinyl compound, an internal release agent is added to the composition that contains the raw materials in order to readily release the optical material from the mold (or a molding die) (see Korean Patent No. 10-1187975).

However, the internal release agent added to the composition is not reactive and is thus present as an impurity upon curing. Hence, if the lens is used for a long period of time, it causes a problem to the transparency of the lens, and it is also difficult to keep the curing process consistent.

DISCLOSURE OF THE INVENTION

Technical Problem

Accordingly, the embodiments aim to provide a method and an apparatus with a high release ratio and a low damage ratio of a mold and a molded article while minimizing the amount of a mold release agent used.

Solution to the Problem

According to an embodiment, there is provided a method for releasing a molded article from a mold, which comprises fixing the mold containing the molded article to a support; and pressing the lateral of the molded article in the fixed mold with a presser.

According to another embodiment, there is provided an apparatus for releasing a molded article from a mold, which comprises a support for fixing the mold containing the molded article; and a presser for pressing the lateral of the molded article in the fixed mold.

Advantageous Effects of the Invention

The method and the apparatus according to the embodiments are capable of efficiently releasing a molded article with a high release ratio and a low damage ratio of the mold and the molded article while minimizing the amount of a mold release agent used.

REFERENCE NUMERALS OF THE DRAWINGS

Figure 1:
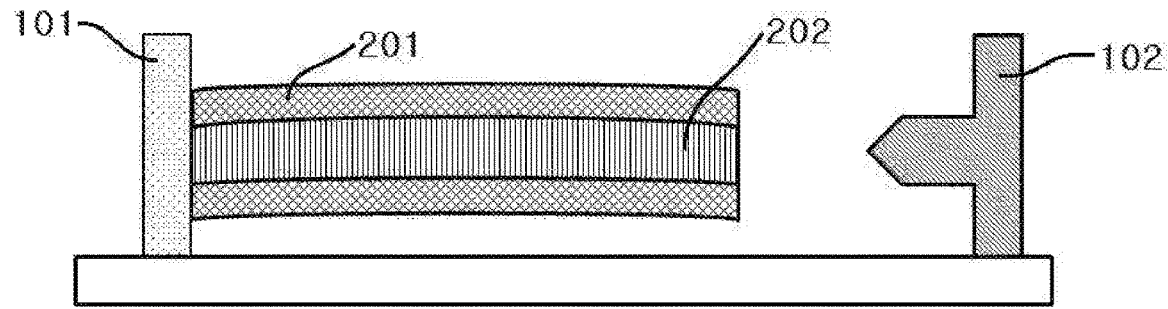
FIGS. 1 and 2 illustrate a cross-sectional view and a plan view of an apparatus for releasing a molded article from a mold according to an embodiment, respectively.

101: support for fixing a mold
102: presser
201: mold
202: molded article
(a) pressed displacement (the range in which the molded article is compressed by pressing)

BEST MODE FOR CARRYING OUT THE INVENTION

Hereinafter, the embodiments will be described in detail.

Method for Releasing a Molded Article from a Mold

The method for releasing a molded article from a mold according to an embodiment comprises (1) fixing the mold containing the molded article to a support; and (2) pressing the lateral of the molded article in the fixed mold with a presser.

Step (1)

In this step, a mold that contains a molded article is fixed to a support.

Molded Article

The molded article may be a plastic lens. In addition, the molded article may comprise an internal release agent.

The molded article may be obtained from a composition that comprises a polythiourethane-based compound or an acrylic-based compound.

The polythiourethane-based compound may be obtained from a composition that comprises a polythiol compound and an isocyanate compound.

The polythiol compound is not particularly limited as long as it is a conventional one used for the synthesis of polythiourethane. For example, it may comprise at least one selected from the group consisting of bis(2-(2-mercaptoethylthio)-3-mercaptopropyl) sulfide, 4-mercaptomethyl-1,8-dimercapto-3,6-dithiaoctane, 2,3-bis(2-mercaptoethylthio)propane-1-thiol, 2,2-bis(mercaptomethyl)-1,3-propanedithiol, bis(2-mercaptoethyl) sulfide, tetrakis(mercaptomethyl)methane, 2-(2-mercaptoethylthio)propane-1,3-dithiol, 2-(2,3-bis(2-mercaptoethylthio)propylthio)ethanethiol, bis(2,3-dimercaptopropanyl) sulfide, bis(2,3-dimercaptopropanyl) disulfide, 1,2-bis(2-mercaptoethylthio)-3-mercaptopropane, 1,2-bis(2-(2-mercaptoethylthio)-3-mercaptopropylthio)ethane, 2-(2-mercaptoethylthio)-3-2-mercapto-3-[3-mercapto-2-(2-mercaptoethylthio)-propylthio]propylthio-propane-1-thiol, 2,2-bis-(3-mercaptopropionyloxymethyl)-butyl ester, 2-(2-mercaptoethylthio)-3-(2-[2-[3-mercapto-2-(2-mercaptoethylthio)-propylthio]ethylthio)ethylthio)propane-1-thiol, (4R,11S)-4,11-bis(mercaptomethyl)-3,6,9,12-tetrathiatetradecane-1,14-dithiol, (S)-3-((R-2,3-dimercaptopropyl)thio)propane-1,2-dithiol, (4R,14R)-4,14-bis(mercaptomethyl)-3,6,9,12,15-pentathiaheptane-1,17-dithiol, (S)-3-((R-3-mercapto-2-((2-mercaptoethyl)thio)propylthio)propylthio)-2-((2-mercaptoethyl)thio)propane-1-thiol, 3,3'-dithiobis(propane-1,2-dithiol), (7R,11S)-7,11-bis(mercaptomethyl)-3,6,9,12,15-pentathiaheptadecane-1,17-dithiol, (7R,12S)-7,12-bis(mercaptomethyl)-3,6,9,10,13,16-hexathiaoctadecane-1,18-dithiol, 5,7-dimercaptomethyl-1,11-dimercapto-3,6,9-trithiaundecane, 4,7-dimercaptomethyl-1,11-dimercapto-3,6,9-trithiaundecane, 4,8-dimercaptomethyl-1,11-dimercapto-3,6,9-trithiaundecane, pentaerythritol tetrakis(3-mercaptopropionate), trimethylolpropane tris(3-mercaptopropionate), pentaerythritol tetrakis(2-mercaptoacetate), bispentaerythritol-ether-hexakis(3-mercaptopropionate), 1,1,3,3-tetrakis(mercaptomethylthio)propane, 1,1,2,2-tetrakis(mercaptomethylthio)ethane, 4,6-bis(mercaptomethylthio)-1,3-dithiane, and 2-(2,2-bis(mercaptodimethylthio)ethyl)-1,3-dithiane.

The isocyanate compound is not particularly limited as long as it is a conventional one used for the synthesis of polythiourethane. For example, it may comprise at least one selected from the group consisting of an aliphatic isocyanate compound such as dicyclohexylmethane-4,4-diisocyanate, hexamethylene diisocyanate, 2,2-dimethyl pentane diisocyanate, 2,2,4-trimethylhexane diisocyanate, butene diisocyanate, 1,3-butadiene-1,4-diisocyanate, 2,4,4-trimethylhexamethylene diisocyanate, 1,6,11-undecatriisocyanate, 1,3,6-hexamethylene triisocyanate, 1,8-diisocyanate-4-isocyanatomethyloctane, bis(isocyanatoethyl) carbonate, and bis(isocyanatoethyl) ether; a cycloaliphatic isocyanate compound such as isophorone diisocyanate, 1,2-bis(isocyanatomethyl)cyclohexane, 1,3-bis(isocyanatomethyl)cyclohexane, 1,4-bis(isocyanatomethyl)cyclohexane, dicyclohexylmethane diisocyanate, cyclohexane diisocyanate, methylcyclohexane diisocyanate, dicyclohexyldimethylmethane isocyanate, 2,2-dimethyldicyclohexylmethane isocyanate; and an aromatic isocyanate compound such as bis(isocyanatoethyl)benzene, bis(isocyanatopropyl)benzene, bis(isocyanatobutyl)benzene, bis(isocyanatomethyl)naphthalene, bis(isocyanatomethyl) diphenyl ether, phenylene diisocyanate, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, biphenyl diisocyanate, toluidine diisocyanate, 4,4-diphenylmethane diisocyanate, 3,3-dimethyldiphenylmethane-4,4-diisocyanate, bibenzyl-4,4-diisocyanate, bis(isocyanatophenyl)ethylene, 3,3-dimethoxybiphenyl-4,4-diisocyanate, hexahydrobenzene diisocyanate, hexahydrodiphenylmethane-4,4-diisocyanate, o-xylene diisocyanate, m-xylene diisocyanate, and p-xylene diisocyanate; an aliphatic isocyanate compound containing sulfur such as bis(isocyanatoethyl) sulfide, bis(isocyanatopropyl) sulfide, bis(isocyanatohexyl) sulfide, bis(isocyanatomethyl) sulfone, bis(isocyanatomethyl) disulfide, bis(isocyanatopropyl) disulfide, bis(isocyanatomethylthio)methane, bis(isocyanatoethylthio)methane, bis(isocyanatoethylthio)ethane, bis(isocyanatomethylthio)ethane, and 1,5-diisocyanato-2-isocyanatomethyl-3-thiapentane; an aromatic isocyanate compound containing sulfur such as diphenyl sulfide-2,4-diisocyanate, diphenyl sulfide-4,4-diisocyanate, 3,3-dimethoxy-4,4-diisocyanatodibenzyl thioether, bis(4-isocyanatomethylbenzene) sulfide, 4,4-methoxybenzenethioethylene glycol-3,3-diisocyanate, diphenyl disulfide-4,4-diisocyanate, 2,2-dimethyl diphenyl disulfide-5,5-diisocyanate, 3,3-dimethyl diphenyl disulfide-5,5-diisocyanate, 3,3-dimethyl diphenyl disulfide-6,6-diisocyanate, 4,4-dimethyldiphenyldisulfide-5,5-diisocyanate, 3,3-dimethoxydiphenyl disulfide-4,4-diisocyanate, and 4,4-dimethoxydiphenyl disulfide-3,3-diisocyanate; a heterocyclic isocyanate compound containing sulfur such as 2,5-diisocyanatothiophene, 2,5-bis(isocyanatomethyl)thiophene, 2,5-diisocyanatotetrahydrothiophene, 2,5-bis(isocyanatomethyl)tetrahydrothiophene, 3,4-bis(isocyanatomethyl)tetrahydrothiophene, 2,5-diisocyanato-1,4-dithiane, 2,5-bis(isocyanatomethyl)-1,4-dithiane, 4,5-diisocyanato-1,3-dithiolane, 4,5-bis(isocyanatomethyl)-1,3-dithiolane, and 4,5-bis(isocyanatomethyl)-2-methyl-1,3-dithiolane.

The acrylic-based compound may be obtained from a composition that comprises an acrylate compound and a vinyl compound.

The acrylate compound is not particularly limited as long as it is a conventional one used for the synthesis of an acrylic-based compound. For example, it may be at least one selected from the group consisting of bisphenol A-type epoxy (meth)acrylate, bromine-based bisphenol A-type epoxy (meth)acrylate, bisphenol A-type ethylated (meth)acrylate, bisphenol F-type epoxy (meth)acrylate, bisfluorene epoxy (meth)acrylate, bisfluorene ethylated (meth)acrylate, thiodiphenol epoxy (meth)acrylate, thiodiphenol ethylated (meth)acrylate, phenoxyethyl (meth)acrylate, benzyl (meth)acrylate, o-phenylphenol ethyl (meth)acrylate, phenyl benzyl (meth)acrylate, and thiophenyl ethyl (meth)acrylate. The term (meth)acrylate refers to methacrylate or acrylate.

The vinyl compound is not particularly limited as long as it is a conventional one used for the synthesis of an acrylic-based compound. For example, it may be at least one selected from the group consisting of styrene, alpha methyl styrene, alpha methyl styrene dimer, o-divinylbenzene, m-divinylbenzene, p-divinylbenzene, m-diisopropenylbenzene, and p-diisopropenylbenzene.

The internal release agent is not particularly limited as long as it is a conventional one to be contained in a plastic lens. For example, it may be at least one selected from the group consisting of a fluorine-based nonionic surfactant having a perfluoroalkyl group, a hydroxyalkyl group, or a phosphate ester group; a silicone-based nonionic surfactant having a dimethylpolysiloxane group, a hydroxyalkyl group, or a phosphate ester group; an alkyl quaternary ammonium salt such as trimethylcetylammonium salt, trimethyl stearylammonium salt, dimethylethylcetylammonium salt, triethyldodecylammonium salt, trioctylmethylammonium salt, and diethylcyclohexadodecylammonium salt; and an acidic phosphate ester.

The molded article may have a modulus at 20° C. to 70° C. of 500 MPa to 5,000 MPa. More specifically, the molded article may have a modulus at 20° C. to 70° C. of 1,000 MPa to 5,000 MPa or 1,100 MPa to 3,000 MPa. If the modulus of the molded article at 20° C. to 70° C. is within the above range, the damage ratio of the molded article is low and the mold release ratio is high at the time of the mold release, so that the molded article can be released more effectively.

Mold

The mold is not particularly limited as long as it is used for preparing a plastic lens. Specifically, the mold may be a glass mold.

The mold may have a modulus at 20° C. to 70° C. of 50,000 MPa to 70,000 MPa. Specifically, the mold may have a modulus at 20° C. to 70° C. of 60,000 MPa to 70,000 MPa or 64,000 MPa to 68,000 MPa. If the modulus of the mold at 20° C. to 70° C. is within the above range, the damage ratio of the mold is low and the mold release ratio is high at the time of the mold release, so that the molded article can be released more effectively.

The ratio of the modulus of the mold to the modulus of the molded article at 20° C. to 70° C. may be 10:1 to 200:1. Specifically, the ratio of the modulus of the mold to the modulus of the molded article at 20° C. to 70° C. may be 20:1 to 100:1, 30:1 to 100:1, 30:1 to 80:1, or 30:1 to 70:1. If the ratio of the modulus of the mold to the modulus of the molded article at 20° C. to 70° C. is within the above range, the release of the molded article from the mold is readily carried out by the pressing applied to the lateral of the molded article at the time of the mold release. Thus, the release ratio of the molded article is high and the damage ratio of the mold and the molded article is low, resulting in an enhanced mold release efficiency.

As a specific example, the modulus at 20° C. to 70° C. of the mold may be 50,000 MPa to 70,000 MPa, the modulus of the molded article may be 500 MPa to 5,000 MPa, and the ratio of the modulus of the mold to the modulus of the molded article may be 10:1 to 200:1.

Step (2)

In this step, the lateral of the molded article in the fixed mold is pressed with a presser.

The pressing may be applied to the lateral of the molded article in the mold. Specifically, the pressing may be applied the lateral of the molded article in the mold such that the lateral of the molded article is compressed by 0.01 mm to 5.0 mm or 0.1 mm to 5.0 mm. If the pressing is carried out so as to be compressed within the above range, the damage ratio of the molded article is low and the release ratio of the molded article is high, resulting in an enhanced mold release efficiency.

The pressing may be applied to one point on the lateral of the molded article in the mold or applied to several points on the lateral of the molded article in the mold. Specifically, the pressing may be applied to one point of the lateral of the molded article at least once without moving the mold, which contains the molded article, or may be applied to various points on the lateral of the molded article while rotating or moving the mold, which contains the molded article.

The pressing may be carried out at 50° C. to 130° C. Specifically, the pressing may be carried out at 60° C. to 130° C. or 60° C. to 120° C. If the pressing is carried out within the above temperature range, the damage ratio of the molded article is low and the release ratio of the molded article is high, resulting in an enhanced mold release efficiency.

The method according to the embodiment may have a damage ratio of a mold of 0% to 8%. Specifically, the method may have a damage ratio of a mold of 0% to 5%. The damage ratio of a mold may refer to the ratio in percent of the number of cases in which damage occurs in a mold to the total number of mold release when the release of a molded article from a mold is repeated several times.

In addition, the method according to the embodiment may have a damage ratio of a molded article of less than 8%. Specifically, the method may have a damage ratio of a molded article of less than 5%. The damage ratio of a molded article may refer to the ratio in percent of the number of cases in which damage occurs in a molded article to the total number of mold release when the release of a molded article from a mold is repeated several times.

In addition, the method according to the embodiment may have a release ratio of a molded article of 90% to 100%. Specifically, the method may have a release ratio of a molded article of 95% to 100%. The release ratio of a molded article may refer to the ratio in percent of the number of cases in which no damage occurs in a molded article and a mold to the total number of mold release when the release of a molded article from a mold is repeated several times.

As a specific example, the method according to the embodiment may have a damage ratio of a mold of 0% to 8/%, a damage ratio of a molded article of less than 8%, and a release ratio of a molded article of 90% to 100%.

Apparatus for Releasing a Molded Article from a Mold

The apparatus for releasing a molded article from a mold according to an embodiment comprises a support for fixing the mold containing the molded article; and a presser for pressing the lateral of the molded article in the fixed mold.

Figure 2:
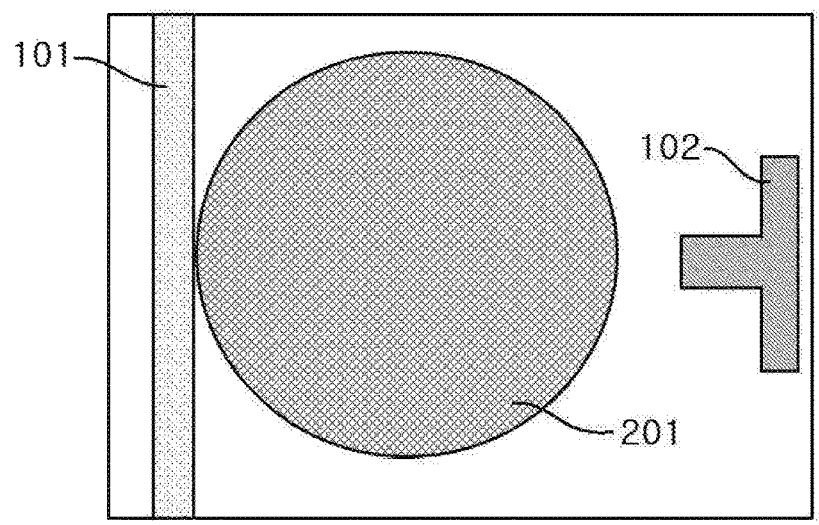

Referring to FIGS. 1 and 2, the apparatus according to an embodiment comprises a support (101) for fixing a mold (201) containing a molded article (202); and a presser (102) for pressing the lateral of the molded article in the fixed mold.

The mold may be a glass mold, and the molded article may be a plastic lens. In addition, the molded article and the mold are as described above with respect to the method according to an embodiment.

The presser is capable of pressing the lateral of the molded article in the mold such that the lateral of the molded article is compressed by 0.01 mm to 5.0 mm or 0.1 mm to 5.0 mm.

Figure 3:
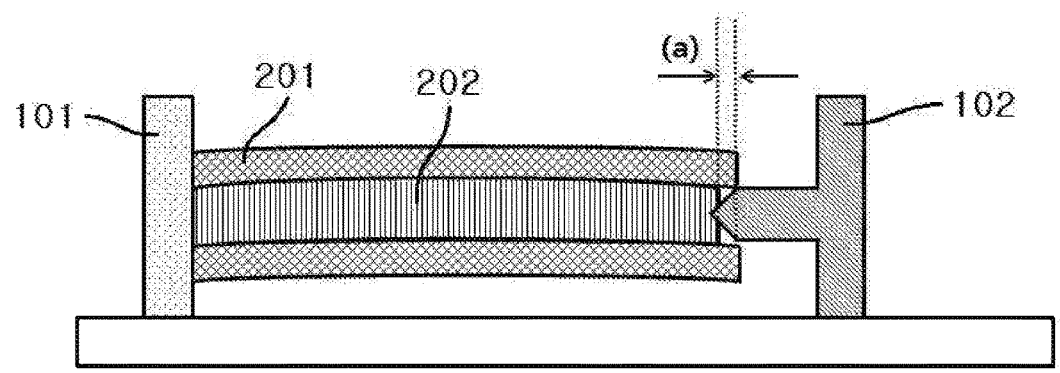
FIG. 3 illustrates the pressing with an apparatus for releasing a molded article from a mold according to an embodiment.

Referring to FIG. 3, the apparatus according to an embodiment is capable of pressing the lateral of the molded article (202) in the mold (201) with a presser (102). In such event, the lateral may be compressed by (a), wherein (a) may be 0.01 mm to 5.0 mm or 0.1 mm to 5.0 mm.

EXAMPLE

Hereinafter, the present invention is explained in detail by Examples. But the scope of the present is not limited thereto only.

Preparation Example 1: Preparation of a Molded Article 52 parts by weight of m-xylylene diisocyanate as an isocyanate compound, 0.01 part by weight of dibutyltin dichloride as a curing catalyst, 0.1 part by weight of an acidic phosphoric acid alkyl ester (manufacturer: Stepan Company, product name: ZelecUN) as an internal release agent, and 0.05 part by weight of 2-(2'-hydroxy-5'-t-octylphenyl)-2H-benzotriazole (manufacturer: Cytec Industries, product name: CYASORB UV-5411) were mixed at 20° C. 47.84 parts by weight of 4-mercaptomethyl-1,8-dimercapto-3,6-dithiaoctane as a polythiol compound was added to the mixture, which was uniformly mixed to obtain a polymerizable composition.

Thereafter, the polymerizable composition was degassed at 600 Pa for 1 hour and then filtered through a Teflon filter of 3 μm. The filtered polymerizable composition was injected into a glass mold assembled with an adhesive tape. The mold to which the polymerizable composition had been injected was heated from 25° C. to 120° C. at a rate of 5° C./min, and polymerization was carried out at 120° C. for 18 hours. The cured resin in the glass mold was further cured at 130° C. for 4 hours to produce a molded article.

Example 1: Release of a Molded Article from a Mold

The mold containing the molded article as obtained in Preparation Example 1 was heated to 60° C. and fixed to a support of the apparatus as shown in FIG. 1. Thereafter, the lateral of the molded article in the fixed mold was pressed once such that it was compressed by 1 mm (pressed displacement: 1 mm). The molded article was then released from the mold.

Examples 2 to 17: Release of a Molded Article from a Mold

Each molded article was released from a mold in the same manner as in Example 1, except that mold release temperature and the pressed displacement were changed as shown in Table 1 below.

Test Example 100 molded articles were each released from a mold in the same manner as in Examples 1 to 17. In such event, the damage ratio (%) of the glass mold, the damage ratio (%) and the release ratio (%) of the molded article thus released were evaluated by the following methods. The evaluation results are shown in Table 1 below.

(1) Damage Ratio of a Glass Mold and Damage Ratio of a Molded Article

The cases in which damage occurred in the glass mold or in the molded article among the 100 times of mold release were represented in percent.

Specifically, if cracks or breakage occurred in the glass mold upon the mold release, or if a part of the glass mold was detached while adhering to the molded article thus released, the glass mold was evaluated as damaged. In addition, if cracks or breakage occurred in the molded article upon the mold release, or if a part of the molded article was detached while adhering to the glass mold upon the release, the molded article was evaluated as damaged.

(2) Mold Release Ratio

As in Section (1) above, the cases in which no damage occurred in the glass mold and in the molded article among the 100 times of mold release were represented in percent as a mold release ratio.

TABLE 1

| | Mold release temperature (° C.) | Pressed displacement (mm) | Damage ratio of glass mold (%) | Damage ratio of molded article (lens) (%) | Mold release ratio of molded article (%) |
|---|---|---|---|---|---|
| Ex. 1 | 60 | 1 | <5 | <5 | >95 |
| Ex. 2 | 80 | 1 | <5 | <5 | >95 |
| Ex. 3 | 100 | 1 | <5 | <5 | >95 |
| Ex. 4 | 120 | 1 | <5 | <5 | >95 |
| Ex. 5 | 70 | 0.1 | <5 | <5 | >95 |
| Ex. 6 | 70 | 0.5 | <5 | <5 | >95 |
| Ex. 7 | 70 | 1.0 | <5 | <5 | >95 |
| Ex. 8 | 70 | 3.0 | <5 | <5 | >95 |
| Ex. 9 | 70 | 5.0 | <5 | <5 | >95 |
| Ex. 10 | 25 | 1 | <5 | <5 | 10 |
| Ex. 11 | 25 | 3 | 20 | 30 | 50 |
| Ex. 12 | 25 | 6 | 50 | 60 | 25 |
| Ex. 13 | 25 | 9 | 70 | 70 | 20 |
| Ex. 14 | 40 | 1 | 20 | 15 | 65 |
| Ex. 15 | 70 | 0.01 | <5 | <5 | 70 |
| Ex. 16 | 70 | 7.0 | 10 | 10 | 85 |
| Ex. 17 | 70 | 9.0 | 10 | 20 | 80 |

As shown in Table 1, when the release of molded articles was carried out under various conditions, Examples 1 to 9 were the most excellent as they showed a damage ratio of the glass mold and a damage ratio of the molded article of less than 5% and a release ratio of the molded article of 95% or higher.

The invention claimed is:

1. A method for releasing a molded article from a mold, which comprises fixing the mold containing the molded article to a support; and
   pressing the lateral of the molded article in the fixed mold with a presser,
   wherein the pressing is applied to the lateral of the molded article in the mold such that the lateral of the molded article is compressed by 0.1 mm to 5.0 mm,
   wherein the modulus at 20° C. to 70° C. of the mold is 50,000 MPa to 70,000 MPa, the modulus of the molded article is 500 MPa to 5,000 MPa, and the ratio of the modulus of the mold to the modulus of the molded article is 30:1 to 70:1,
   wherein the pressing is carried out at 60° C. to 120° C.; and
   wherein a damage ratio of the mold is 0% to 5%, and a release ratio of the molded article is 95% to 100%.

2. The method of claim 1, which has a damage ratio of the molded article of less than 8%.

3. The method of claim 1, wherein the molded article comprises an internal release agent.

4. The method of claim 1, wherein the mold is a glass mold, and the molded article is a plastic lens.

* * * * *